C. M. MOHLER.
SPRING SADDLE AND SHOCK ABSORBER.
APPLICATION FILED DEC. 22, 1919.
1,360,135.
Patented Nov. 23, 1920.
2 SHEETS—SHEET 2.
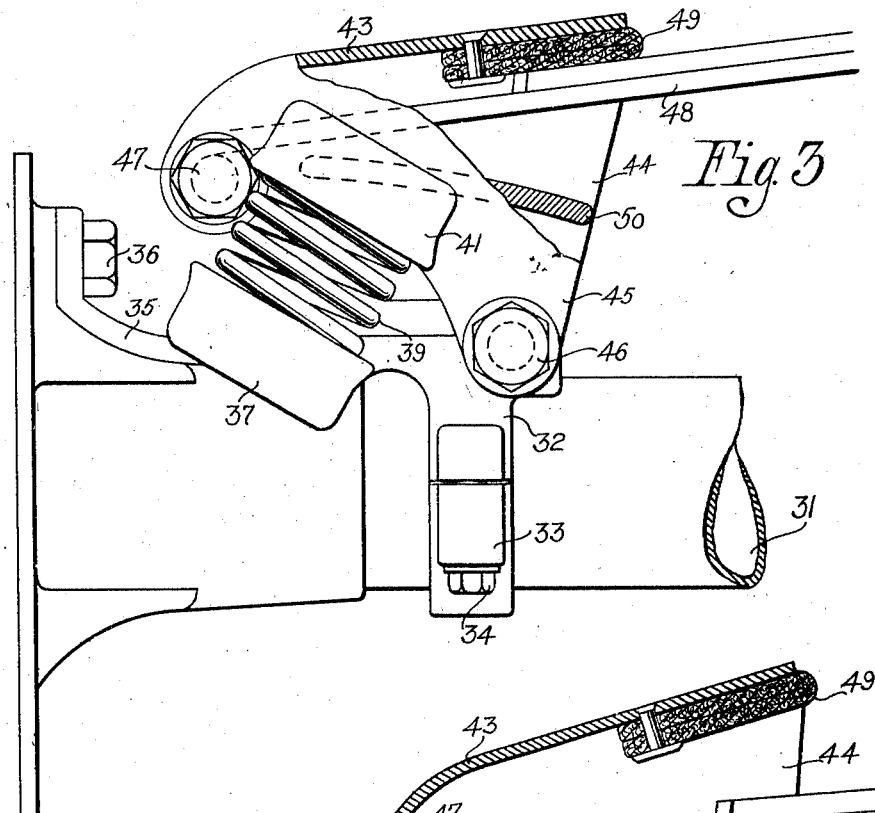
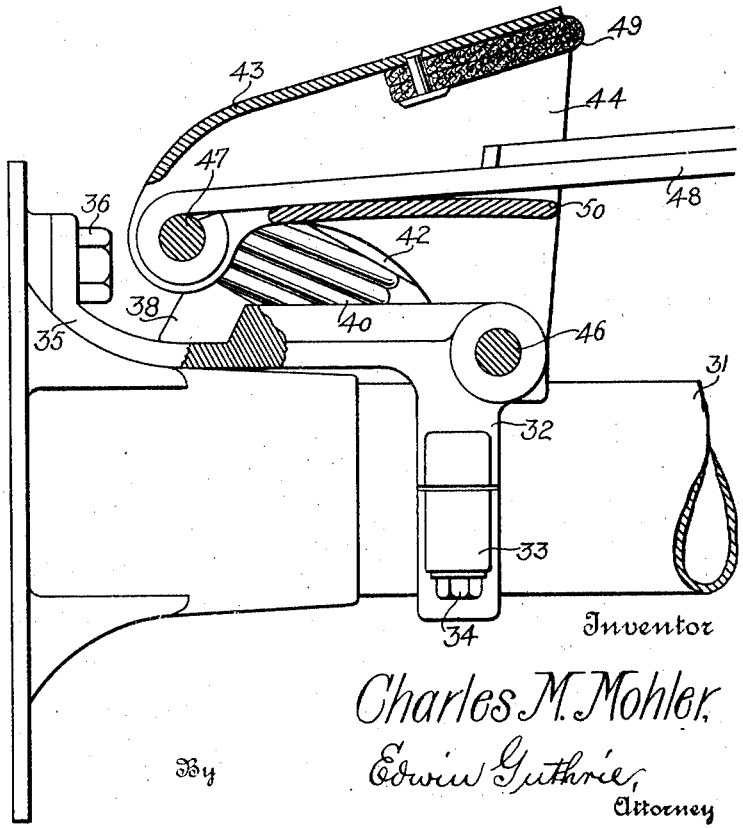
Inventor
Charles M. Mohler.
By Edwin Guthrie,
Attorney

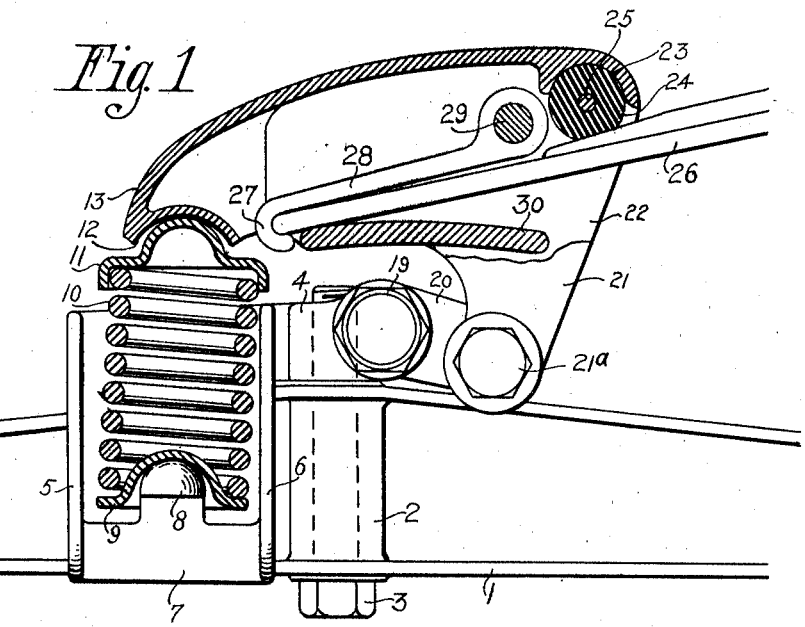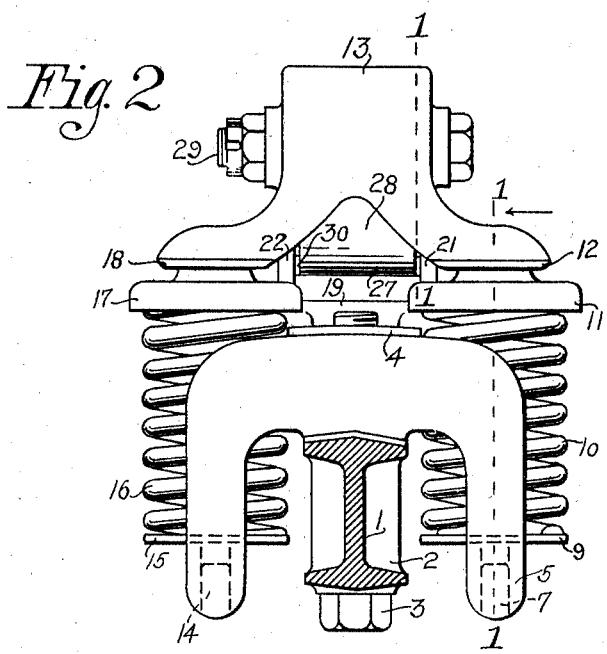

UNITED STATES PATENT OFFICE.

CHARLES M. MOHLER, OF RICHMOND, INDIANA.

SPRING-SADDLE AND SHOCK-ABSORBER.

1,360,135.　　　　　Specification of Letters Patent.　　Patented Nov. 23, 1920.

Application filed December 22, 1919. Serial No. 346,489.

*To all whom it may concern:*

Be it known that I, CHARLES M. MOHLER, citizen of the United States, residing at Richmond, in the county of Wayne and State of Indiana, have invented certain new and useful Improvements in Spring-Saddles and Shock-Absorbers, of which the following is a specification.

This invention relates to spring saddles and shock absorbers for automobiles, and is believed to be an improvement on my invention set forth in my application for Letters Patent of the United States filed August 7, 1919, Serial No. 315,946, allowed November 5, 1919. The object of this invention is the production of an auxiliary spring device of the character stated, having parts of particular form and arrangement making this invention especially adapted to Ford motor vehicles.

The shock absorbing devices herein shown and described, and also those set out in my said allowed application for patent, are all based upon three distinct principles that are new and practical. First, there is a variable point of loading the main or leaf spring of the vehicle. Light loads are carried on the tips of the main springs, and as the load increases, the point of carrying the load on the leaf springs travels toward the middle of the springs, thereby shortening the arms or portions of the main springs involved in the operation. This movement of the point of carrying the load enables the main springs to carry loads of much greater weights. Secondly, there is a limiting of the load carried on the shock springs. When the load has reached an amount that has compressed the shock springs and deflected the main or leaf springs to an extent or degree at which the load is carried on the leaf spring vertically over the rocker bolt, the shock springs are then loaded as much as they can ever be. Any increase in load beyond that point is transmitted from the frame to the main spring directly through the rocker bolt, while lighter loads are transmitted from the frame to the main springs by way of the rocker bolt, the rocker and shock springs. The shock springs are designed and made to absorb car vibrations only, and not surges and lunges, which are absorbed by the main springs. Thirdly, a spring device constructed in accordance with this invention relieves the shock or jar of the rebound motion. The shock springs are compressed on the rebound as well as on their depression. That means much more in the operation of the car than comfortable riding only. The result is that axles and wheels are not lifted off the road bed nearly so often as is the case with other types of shock absorbers with which this applicant is familiar. When the rear wheels of a car are lifted off the ground the engine and wheels immediately speed up to very high velocities, just as does the propeller of a boat when raised out of the water. When the wheels return to the ground there occurs a violent shock and corresponding abrasion of the tires. The reverse actions take place with respect to the front wheels. When the front wheels are lifted off the ground they immediately slow down, and when they again strike the ground they must be instantaneously brought up to speed, and a considerable shock results.

In the accompanying drawings the construction and arrangement of the various parts of this invention are illustrated. Figure 1 represents a side view of this invention, partly in vertical section, applied to the front axle of a Ford machine. Fig. 2 is a front view of this invention applied to the front axle of a Ford machine, the axle being shown in section. Fig. 3 is a side view of this invention, partly in vertical section, showing a modification applied to the rear axle of a Ford machine. Fig. 4 is a side view similar to Fig. 3, the difference in these views being that in Fig. 3 the parts are illustrated in their positions under very light or no load or in the rebound positions, and in Fig. 4 the load is heavy and the shock springs are fully compressed.

Throughout the description and drawings, the same number is used to refer to the same part.

Considering Figs. 1 and 2, the axle 1 has secured thereon a frame or saddle. To secure the saddle advantage is taken of the usual vertical enlargement 2 on the front axle of a Ford machine through which passes a bolt 3. The saddle is designated by numeral 4. In Fig. 1 will be noted two vertical barrier plates, each having the flatside shape set out in Fig. 2, these plates are marked 5 and 6, and in Fig. 1 the plates are shown as connected at their lower ends by a bridge piece 7, formed in practice integrally with the plates. Upon the middle of the bridge piece 7 is a hemispherical head 8, and upon the head is placed the cap 9 that affords a seat for the lower end of the coil spring 10. At the top the spring engages another cap or spring seat 11 which has a central, hollow rounded raised portion engaging the dished end 12 of the rocking casing 13. On the left hand side as indicated in Fig. 2 the barriers or plates 5 and 6 are connected by a bridge piece 14, in every way like the bridge piece 7, and provided with a hemispherical head, not shown. The bridge piece 14 carries the spring seat 15 from which rises the coil spring 16, having at the top the cap 17 engaging the dished end 18 of the rocker casing 13.

Further considering Fig. 1, it will be observed that a bolt 19 couples a link 20 with the saddle 4, and the other end of the link passes between the lower ends of the sides or legs 21 and 22 of the casing 13, to which sides or legs the link is pivotally secured by the pivot bolt 21$^a$, termed the rocker bolt.

At the top of the casing 13, as shown in Fig. 1 there is formed a part cylindrical socket 23 for a cylindrical rubber cushion 24, that is held in place by the pin 25 passing through the sides of the casing. For the purpose of this description the end of the casing provided with the cushion is termed the rear end, and the space between the sides 21 and 22 is open. Through the open rear of the casing passes the leaf spring 26, and the spring extends into the front or forward part of the casing where it engages the hook end 27 of an arm 28, the other end of which is pivotally supported by the pivot bolt 29 that passes through the casing near the cushion 24. The cushion is arranged as shown above the leaf spring, and below the leaf spring is the curved bearing plate or table 30 extending transversely between and supported by the sides of the casing 13.

In Figs. 3 and 4 there is set forth a modification of this invention as applied to the rear axle 31 of a Ford machine. On the axle is a saddle or frame rider 32 secured by the clamp 33 and bolt 34. The saddle is further secured in place by means of a projecting curved arm 35 secured by the bolt 36 as shown. On either side of the saddle there is a cupped spring seat or endhold. The cups are marked 37 and 38 and receive the lower ends of the coil springs 39 and 40. The cups 37 and 38 are usually formed integrally with the saddle. The upper ends of the springs are seated in like cups 41 and 42, which form parts of the rocker casing 43, and the cups project from the sides or legs 44 and 45 of the casing. The lower ends of the sides or legs of the casing are secured to the saddle by the rocker bolt 46. At the front end of the casing a pivot bolt 47 connects the end of the leaf spring 48 with the casing. The rear of the casing is open, and the leaf spring passes into the casing through the open rear. At the top of the casing near the open rear is secured the fabric or felt cushion 49 above the leaf spring, and below the leaf spring is the curved bearing plate or table 50 supported by the sides of the casing.

The operation of both forms of this invention is the same. Light variations of load are taken up by the coil springs, which are termed the shock springs, and the tips of the leaf springs. Greater loads may completely compress the shock springs causing the casings to rock and the load to be taken up by the leaf spring, the same being brought into contact with the bearing plates or tables, and the point or area of contact between the spring and table moving inwardly toward the middle of the leaf springs as the load increases. When that point is vertically over the rocker bolts, the load pressure is transmitted directly to the leaf springs by the bolts acting through the sides of the casings as explained herein above.

Having now described this invention and the mode of its use and operation, what I claim is:—

1. In a spring saddle and shock absorber, the combination with an axle, of a saddle, means for securing the saddle upon the axle, a rocking casing having sides or legs, means for pivotally securing the lower portions of the said sides to the said saddle, the rear of the said casing being open, a leaf spring passing into the casing through the open rear thereof and extending into the front part of the casing, means for pivotally securing the end of the spring to the casing, and a coil spring interposed between the front end of the casing and the said saddle.

2. In a spring saddle and shock absorber, the combination with an axle, of a saddle, means for securing the saddle upon the axle, a rocking casing having sides or legs, means for pivotally securing the lower portions of the said sides to the said saddle, the rear portion of the said casing being open, a leaf spring passing into the casing through the open rear thereof and extending into the front part of the casing, means for pivotally securing the end of the spring to the casing, a curved bearing plate arranged transversely in the casing below the leaf spring and supported by the sides of the casing, and a coil spring interposed between the front end of the casing and the said saddle.

3. In a spring saddle and shock absorber, the combination with an axle, of a saddle, means for securing the saddle upon the axle, a rocking casing having sides or legs, means pivotally securing the lower portions of the sides to the saddle, the rear of the said casing being open, a leaf spring passing into the casing through the open rear thereof and extending into the front part of the casing, a curved bearing plate arranged transversely in the casing below the said leaf spring and supported by the casing, a cushion arranged at the top of the open rear of the casing above the said leaf spring and supported by the casing, and a coil spring interposed between the front end of the casing and the said saddle.

4. In a spring saddle and shock absorber, the combination with an axle, of a saddle, means for securing the saddle upon the axle, a rocking casing having sides or legs, means for pivotally securing the lower portions of the said sides to the said saddle, the rear of the casing being open, a leaf spring passing into the casing through the open rear thereof and extending into the front part of the casing, an arm having a hook at the front end and engaging the end of the said leaf spring, the other end of the said arm being pivotally connected with the casing near the open rear thereof, and a coil spring interposed between the front end of the casing and the said saddle.

5. In a spring saddle and shock absorber, the combination with a casing having an open rear, of an axle, means for pivotally securing the casing near the open rear thereof upon the axle, a leaf spring extending into the casing through the said open rear thereof, means for pivotally connecting the end of the spring to the casing, a curved bearing plate supported by the casing below the spring, a cushion supported by the casing above the spring, and a coil spring interposed between the front end of said casing and the said axle.

In testimony whereof I affix my signature.

CHARLES M. MOHLER.